US012748414B2

(12) United States Patent
Park et al.

(10) Patent No.: US 12,748,414 B2
(45) Date of Patent: Sep. 29, 2026

(54) FAULT INJECTION TEST METHOD AND APPARATUS, AND FAULT INJECTION METHOD

(71) Applicants: Hyundai Motor Company, Seoul (KR); Kia Corporation, Seoul (KR)

(72) Inventors: SunYoung Park, Suwon-Si (KR); Hoerae Kim, Suwon-Si (KR); Jae Hyoung Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 400 days.

(21) Appl. No.: 18/370,937

(22) Filed: Sep. 21, 2023

(65) Prior Publication Data

US 2024/0231347 A1 Jul. 11, 2024

(30) Foreign Application Priority Data

Jan. 11, 2023 (KR) ........................ 10-2023-0004170

(51) Int. Cl.
*G05B 23/02* (2006.01)

(52) U.S. Cl.
CPC ................................ *G05B 23/0256* (2013.01)

(58) Field of Classification Search
CPC ............. G05B 23/0256; G06F 11/3656; G06F 11/2236; G06F 11/261; G06F 11/3698
See application file for complete search history.

(56) References Cited

U.S. PATENT DOCUMENTS

| | | | | |
|---|---|---|---|---|
| 11,609,560 | B2 * | 3/2023 | Wang | H04L 67/12 |
| 12,503,004 | B2 * | 12/2025 | Zhu | B60L 53/80 |
| 2005/0102594 | A1 * | 5/2005 | Dey | G01R 31/318328 714/733 |
| 2017/0249224 | A1 * | 8/2017 | Suzuki | G06F 11/27 |

FOREIGN PATENT DOCUMENTS

KR 10-2018-0134677 A 12/2018

OTHER PUBLICATIONS

Fidalgo et al. (Real Time Fault Injection Using Enhanced OCD—A Performance Analysis, IEEE, 2006) (Year: 2006).*
Fidalgo et al. (“A modified debugging infrastructure to assist real time fault injection campaigns”, 2006) (Year: 2006).*
Vinter et al. (Experimental Dependability Evaluation of a Fail-Bounded Jet Engine Control System for Unmanned Aerial Vehicles, 2007). (Year: 2007).*
Campelo et al. (DICOS: a real-time distributed industrial control system for embedded applications, 2001)_ (Year: 2001).*

* cited by examiner

*Primary Examiner* — Mohammad K Islam
(74) *Attorney, Agent, or Firm* — Banner & Witcoff, Ltd.

(57) ABSTRACT

A fault injection test method of a fault injection test apparatus connected to a vehicle through a debugger is provided. The fault injection test method includes receiving fault injection conditions from a user; and setting the fault injection conditions using an on-chip debugging system (OCDS) module built into a central processing unit (CPU) of the vehicle controller.

14 Claims, 8 Drawing Sheets

FAULT INJECTION TEST METHOD AND APPARATUS, AND FAULT INJECTION METHOD

CROSS-REFERENCE TO RELATED APPLICATION

This application claims priority to and the benefit of Korean Patent Application No. 10-2023-0004170, filed in the Korean Intellectual Property Office on Jan. 11, 2023, the entire contents of which are incorporated herein by reference.

BACKGROUND

(a) Field

The present disclosure relates to a fault injection test method and apparatus and a fault injection method, and more particularly, to a fault injection test method and apparatus and a fault injection method for control software of a vehicle controller.

(b) Description of Related Art

As various functions are applied to vehicles, an electronic control unit (ECU) for processing them is widely used. As the mechanical control unit is replaced by the ECU, the reliability of the software installed in the ECU is questioned whenever a vehicle safety-related issue occurs. Accordingly, the ISO26262 standard stipulates that a fault injection test should be performed on safety-sensitive software components, thereby applying to the automotive industry the same type of functional safety that has been applied to other safety industries such as railway, aviation, nuclear power, and so forth.

The fault injection test is a series of tests that artificially inject faults into the ECU of the vehicle and check and verify that the normal control operation of the ECU operates and transitions to a safe state by the error recovery mechanism developed and applied to prevent failures at the vehicle level.

Conventionally, a designer might inject artificial faults into the ECU through a debugger, monitor before and after the fault injection, and write a test result report by hand, which is inconvenient in terms of time and cost. Therefore, there is a need for a fault injection automation test method capable of automatically injecting faults into the ECU, monitoring in real time the operation of the ECU into which faults are injected, and automatically generating a test result report.

The above information disclosed in this Background section is only for enhancement of understanding of the background of the disclosure, and therefore it may contain information that does not form the prior art that is already known in this country to a person of ordinary skill in the art.

SUMMARY

At least one embodiment of the embodiments is to provide a fault injection test method and apparatus and a fault injection method capable of accurately injecting fault data into an ECU at a fault injection location.

According to one or more embodiments of the present disclosure, a method may include: receiving, by a fault injection test apparatus connected to a vehicle through a debugger, fault injection conditions from a user; and setting the fault injection conditions using an on-chip debugging system (OCDS) module built into a central processing unit (CPU) of a vehicle controller of the vehicle.

The fault injection conditions may include a fault injection location code address indicating a fault injection target. Setting the fault injection conditions may include storing the fault injection location code address in a first debug register in the CPU.

Setting the fault injection conditions may further include storing, in a second debug register in the CPU, a start address of a memory in the vehicle controller. A trap function, defined for one of a plurality of fault modes, may be stored at the start address. The trap function may correspond to the fault injection location code address.

The plurality of fault modes may include two or more of: a task stop, a task miss, a variable manipulation, or a task overrun.

The fault injection conditions may further include a fault mode, of the plurality of fault modes, to be injected into the fault injection target. The method may further include: injecting, by the CPU of the vehicle controller executing the trap function, a fault of the fault mode into the fault injection target in the vehicle controller; and monitoring an injection result of the fault.

Storing the fault injection location code address may include setting, by a hardware breakpoint in the OCDS module, the fault injection location code address in the first debug register.

According to one or more embodiments of the present disclosure, a fault injection test apparatus may include: one or more processors; and memory storing instructions that, when executed by the one or more processors, cause the fault injection test apparatus to: extract, based on an operating system (OS) software information file of a vehicle controller, fault injection location code addresses of fault injection targets from the vehicle controller; store, using an on-chip debugging system (OCDS) module built into a central processing unit (CPU) of a vehicle controller, the fault injection location code addresses, of the fault injection targets designated by a user, in a first debug register inside the CPU of the vehicle controller; and store, in a second debug register inside the CPU of the vehicle controller, a start address of a memory of the vehicle controller where a trap function is stored, wherein the trap function is for injecting a fault, corresponding to a fault mode designated by the user, into one of the fault injection targets.

The instructions, when executed by the one or more processors, may further cause the fault injection test apparatus to: monitor an injection result of the fault; and inject, by the CPU of the vehicle controller executing the trap function, the fault of the fault mode designated by the user into the one of the fault injection targets in the vehicle controller.

The fault injection location code addresses may be set in the first debug register by a hardware breakpoint in the OCDS module.

According to one or more embodiments of the present disclosure, a method may include: setting, by a fault injection test apparatus and in a first debug register inside a central processing unit (CPU) of a vehicle controller, a fault injection location code address of a fault injection target designated by a user; calling, from a memory of the vehicle controller and based on an address value of a program counter inside the CPU matching the fault injection location code address, a trap function to be executed, wherein the trap function corresponds to the fault injection location code address; and executing the trap function to inject a fault, of a fault mode designated by the user, into the fault injection target.

The method may further include: prior to the calling the trap function, storing, via the fault injection test apparatus, the trap function in the memory of the vehicle controller.

Calling the trap function may include: generating a trigger event based on the address value of the program counter matching the fault injection location code address; and calling, by an on-chip debugging system (OCDS) module built into the CPU, the trap function based on the trigger event.

The method may further include: prior to the calling the trap function, setting, via the fault injection test apparatus, a start address of the memory where the trap function of the fault mode is stored in a second debug register inside the CPU. Calling the trap function may include outputting the start address of the memory based on the trigger event.

According to one or more embodiments, by setting the fault injection conditions into the CPU using the function of an on-chip debugging system (OCDS) module built in the CPU of the vehicle controller, fault injection may be executed in the CPU of the vehicle controller, not the debugger. Accordingly, it is possible to accurately inject faults to a fault injection location desired by the user without interrupting the execution flow of the vehicle controller. In addition, even if there is a delay in communication between the debugger and the vehicle controller, it is possible to accurately inject faults into a fault injection location desired by the user.

DETAILED DESCRIPTION

Figure 1:
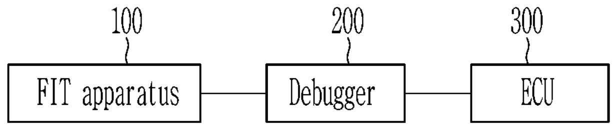
FIG. 1 is a diagram showing the configuration of an entire system for fault injection.

Hereinafter, various embodiments of the present disclosure will be described in detail with reference to the appended drawings so that a person of ordinary skill in the art may easily implement the present disclosure. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Throughout the specification and claims, if a part is referred to "include" a certain element, it means that it may further include other elements rather than exclude other elements, unless specifically indicated otherwise.

In addition, throughout the specification and claims, the suffixes "module", "unit", and/or "group" for components are assigned or used interchangeably in consideration of only the ease of writing the specification, and have meanings or roles that are distinguished from each other by themselves.

In the present specification, terms including an ordinal number, such as first, second, etc., may be used to describe various elements, but the elements are not limited by the terms. The above terms are used only for distinguishing one element from another element. For example, without departing from the scope of the present disclosure, a first element may be referred to as a second element, and similarly, a second element may be referred to as a first element.

Throughout the specification, if an element is referred to be "connected" with another element, it includes not only the case where two elements are "directly connected" but also the case where two elements are "electrically or mechanically connected" with another component interposed therebetween. On the other hand, if an element is referred to as "directly connected" to another element, it should be understood that no other element exists in the middle.

In the flowchart described with reference to the drawings in the present specification, the order of operations may be changed, several operations may be merged, some operations may be divided, and specific operations may not be performed.

Furthermore, in the present specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Also, in this specification, terms such as "unit", "group", and "module" refer to a unit that processes at least one function or operation, and may be implemented as hardware or software or a combination of hardware and software.

Now, one or more fault injection test methods and apparatus and one or more fault injection methods will be described in detail with reference to the drawings.

In fault injection automated testing, a fault injection test (FIT) tool may be used. The FIT tool may be connected to a debugger through a universal serial bus (USB) cable, and the ECU may be connected to the debugger through a joint test action group (JTAG) port for debugging. The FIT tool may inject faults by manipulating the memory of the ECU directly using the memory manipulation function of the debugger. Thus, it may be possible to inject faults while the ECU is running without changing the source code of the software that needs to be verified. However, since the debugger directly manipulates the memory of the ECU to inject the fault, a communication delay between the debugger and the ECU may cause a problem in that a fault value could not be accurately injected into a desired fault injection location. If a breakpoint is set and a fault is injected in order to specify an exact fault injection location, sometimes a fault value may be injected at the breakpoint, but the ECU may stop execution by the breakpoint. Thus, fault injection may not be possible or the injected fault value may not be maintained for a desired amount of time. One or more fault injection test methods and apparatuses described in the present disclosure may address and/or resolve these issues.

Figure 2:
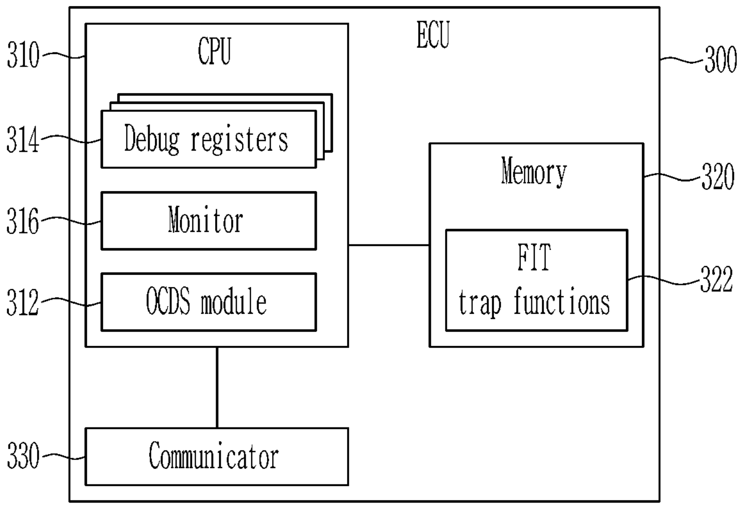
FIG. 2 is a diagram showing the configuration of the ECU shown in FIG. 1.

FIG. 1 is a diagram showing the configuration of an entire system for fault injection, and FIG. 2 is a diagram showing the configuration of the ECU shown in FIG. 1.

Referring to FIG. 1, a system for fault injection may include a fault injection test (FIT) apparatus 100, a debugger 200, and an electronic control unit (ECU) 300 corresponding to a vehicle controller.

The FIT apparatus 100 may be connected to the ECU 300 through the debugger 200. If the FIT apparatus 100 is connected to the ECU 300 through the debugger 200, a fault injection test environment may be set.

The FIT apparatus 100 may receive an operating system (OS) software information file of the ECU 300 from the user. The FIT apparatus 100 may analyze fault injection targets in the ECU 300 based on the OS software information file.

The FIT apparatus 100 may receive fault injection conditions and expected values from the user. The expected value may include fail-safe specification information that should operate normally after fault injection. The fault injection conditions may include information on fault injection locations to inject faults and fault modes to be injected. The fault injection location may indicate a code address of a fault injection target. The fault mode information may indicate types of faults that may appear in a fault injection target, such as tasks, variables, interrupts, and events. For example, types of faults may include task stop, task miss, variable manipulation (e.g., pollution), task overrun, task delay, etc. The fault injection condition may further include a fault injection holding time. The fault injection holding time may indicate a period during which fault injection is maintained from a start point of fault injection.

The FIT apparatus 100 may store a fault injection target, that is, a fault injection location code address indicating a fault injection location, to any one of a plurality of debug registers in the CPU of the ECU 300, based on the fault injection conditions input from the user.

The FIT apparatus 100 may store the start location of the FIT trap function defined for the fault mode in another debug register among a plurality of debug registers, in response to the fault injection location code address.

The FIT trap function may be defined as a function that injects faults corresponding to each fault mode during execution, and can be executed during the fault injection holding time. As an example, the FIT trap function may intentionally change a specific variable to a value of a variable desired by a user of the FIT device 100, that is, a value of a variable that simulates a fault, if the fault mode is variable manipulation. As another example, the FIT trap function can intentionally miss certain tasks if the fault mode task is missed. In this way, since the FIT trap function defines a fault operation for each fault mode, a fault for a fault mode designated by the user may be injected during execution.

In addition, the FIT apparatus 100 may store the FIT trap function in the memory of the ECU 300 so that the FIT trap function of the fault mode input from the user at the fault injection location code address can be executed. An operation of storing the FIT trap function in the memory of the ECU 300 may be performed in advance.

The FIT apparatus 100 may be a program (or application) installed in any one of a laptop, a tablet, and a smart phone, or may be a dedicated terminal that exclusively performs a fault injection test method.

The debugger 200 may be an interface device between the FIT apparatus 100 and the ECU 300, and support an interface between the FIT apparatus 100 and the ECU 300. The debugger 200 may be connected to the FIT apparatus 100 by wire or wirelessly. For example, the debugger 200 may be connected to the FIT apparatus 100 through a universal serial bus (USB) cable. For another example, the debugger 200 may be connected to the ECU 300 through a joint test action group (JTAG) port.

The ECU 300 may be a vehicle ECU.

Referring to FIG. 2, the ECU 300 may include a CPU 310, a memory 320, and a communicator 330. The CPU 310 may include an on-chip debugging system (OCDS) module 312 and a plurality of debug registers 314. Also, the CPU 310 may further include a monitor 316.

The OCDS module 312 may be built into the CPU 310 and perform a debugging function.

The plurality of debug registers 314 may be registers for debugging of the OCDS module 312. Some of the plurality of debug registers 314 may store information to be used during debugging of the OCDS module 312. Some of the plurality of debug registers 314 can be used by the OCDS module 312 to trigger certain actions during debugging, and some of the plurality of debug registers 314 may store information specifying specific conditions or parameters.

One of the plurality of debug registers 314 may store a fault injection location code address through the FIT apparatus 100 for a fault injection test. Also, another one of the plurality of debug registers 314 may store a start address of a memory storing a FIT trap function to be executed if a trigger event occurs for a fault injection location code address. If the fault injection location code address and the start address of the memory where the FIT trap function is stored are stored in different debug registers, the fault injection location code address and the start address of the memory 320 where the FIT trap function is stored may be set to have a correlation with each other.

While the CPU 310 is running, the monitor 316 may monitor the address value of a program counter, which is a part of the general register, and the fault injection location code address stored in the debug register 314. The monitor 316 may generate a trigger event and outputs it to the OCDS module 312 if the address value of the program counter matches the fault injection location code address.

The OCDS module 312 may read the FIT trap function from the start address of the memory 320 where the FIT trap function is stored in response to the trigger event and execute the FIT trap function. If the FIT trap function is executed, a fault of a fault mode specified by a user may be injected into a fault injection location in the ECU 300, and the fault injection may be maintained for a set fault injection holding time.

The memory 320 may store FIT trap functions to be executed corresponding to the fault injection location code address. At this time, a start address of the memory 320 in which the FIT trap function is stored may be mapped to a corresponding fault injection location code address and stored in one of the debug registers 314. Accordingly, the OCDS module 312 may execute the FIT trap function at the start address of the memory 320 corresponding to the fault injection location code address if a trigger event occurs for the fault injection location code address.

The communicator 330 may provide an interface with the debugger 200.

The FIT apparatus 100 may set a fault injection conditions using the debugging function of the OCDS module 312 built into the ECU 300, and while the ECU 300 is running, the OCDS module 312 may execute the FIT trap function to inject a fault in a fault mode designated by the user into a fault injection location in the ECU 300.

As such, the CPU 310 of the ECU 300, and not the debugger 200, may be the one that performs fault injection execution. Therefore, even if a communication delay occurs between the debugger 200 and the ECU 300, fault data can be injected at the correct fault injection location, thereby problems caused by communication delay between the debugger 200 and the ECU 300 can be solved.

Figure 3:
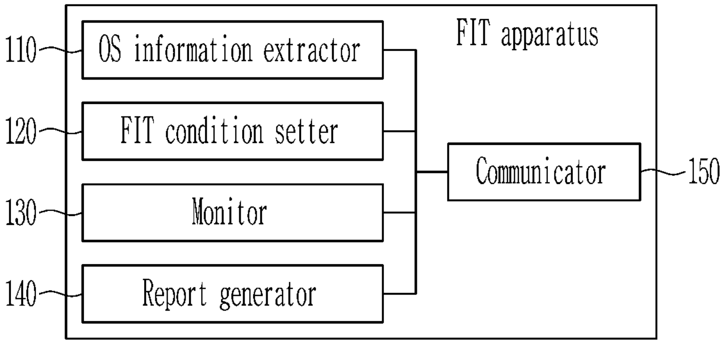
FIG. 3 is a diagram showing the FIT apparatus shown in FIG. 1.
Figure 4:
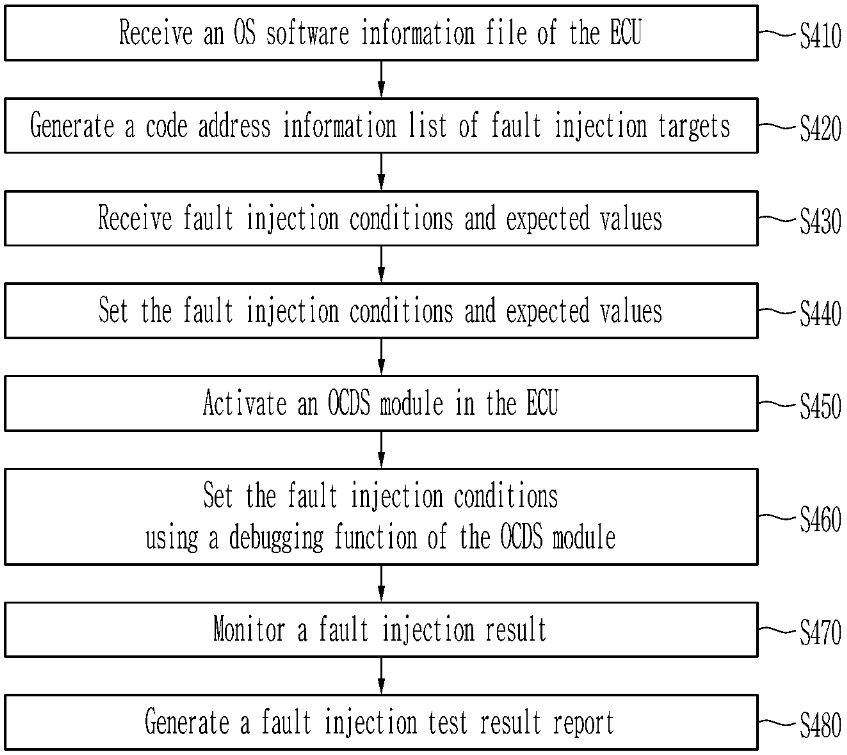
FIG. 4 is a flowchart illustrating a fault injection test method of the FIT device shown in FIG. 3.
Figure 5:
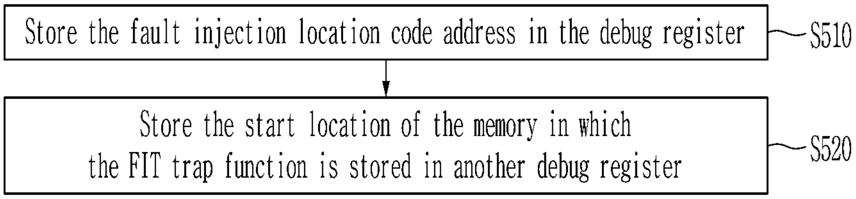
FIG. 5 is a detailed flowchart illustrating a process of setting fault injection conditions shown in FIG. 4.

FIG. 3 is a diagram showing the FIT apparatus shown in FIG. 1. FIG. 4 is a flowchart illustrating a fault injection test method of the FIT device shown in FIG. 3. FIG. 5 is a detailed flowchart illustrating a process of setting fault injection conditions shown in FIG. 4.

In FIG. 3, the FIT apparatus 100 may include an OS information extractor 110, a FIT condition setter 120, a monitor 130, a report generator 140, and a communicator 150.

In FIGS. 3 and 4, the OS information extractor 110 may receive an OS software information file of the ECU 300 from the user (S410).

The OS information extractor 110 may identify code address (e.g., symbol) information such as tasks, interrupts, and events that are targets of fault injection in the ECU 300 based on the OS software information file, and generate and manages a code address information list of fault injection targets (S420).

The FIT condition setter 120 may receive fault injection conditions and expected values from the user (S430) and sets the fault injection conditions and expected values (S440).

The FIT condition setter 120 may activate the OCDS module 312 in the CPU 310 of the ECU 300 through the debugger 200 (S450). The FIT apparatus 100 may transmit an OCDS activation control signal to the debugger 200. The debugger 200 may transmit an OCDS activation control signal to the ECU 300. Upon receiving the OCDS activation control signal, the CPU 310 of the ECU 300 activates the OCDS module 312. As the OCDS module 312 is activated, a fault injection test through the OCDS module 312 becomes possible.

The FIT condition setter 120 may set the fault injection conditions received from the user to the ECU 300 using the debugging function of the OCDS module 312 (S460).

A process of setting fault injection conditions for a fault injection test of the ECU 300 in the FIT apparatus 100 will be described with reference to FIG. 5.

Referring to FIG. 5, the FIT condition setter 120 may store the fault injection location code address in the debug register 314 (S510). A fault injection location code address may be stored in one of the plurality of debug registers 314 by a hardware breakpoint in the OCDS module 312 of the ECU 300.

The FIT condition setter 120 may store the start location of the memory 320 in which the FIT trap function of the fault mode to be injected at the fault injection location is stored in another debug register among the plurality of debug registers 314 (S520). In this way, if a trigger event occurs for the fault injection location code address, the start address of the memory storing the trap function of the fault mode to be executed at the fault injection location code address can be displayed.

In FIG. 5, steps S510 and S520 are illustrated as sequentially performed, but steps S510 and S520 may not be performed sequentially. As an example, steps S510 and S520 may be performed simultaneously.

On the other hand, the FIT trap function defining the faults of each fault mode is stored in the starting location of the memory 320 of the ECU 300, and the operation of storing the FIT trap function in the memory 320 of the ECU 300 may be performed in advance before receiving fault injection conditions from the user. Alternatively, the operation of storing the FIT trap function in the memory 320 of the ECU 300 may be performed before step S510, after step S510, or after step S520.

In this way, the process of setting the fault injection conditions for the fault injection test of the ECU 300 in the FIT apparatus 100 may be completed.

Meanwhile, as the CPU 310 of the ECU 300 executes the FIT trap function, a fault in a fault mode designated by the user may be injected into a fault injection location designated by the user. A process of injecting faults in the CPU 310 of the ECU 300 will be described later with reference to FIG. 6.

In FIGS. 3 and 4, the monitor 130 may monitor the fault injection result of the ECU 300 (S470). The monitor 130 may monitor whether a fault corresponding to fault injection conditions set by the user is detected. The monitor 130 may monitor whether a set expected value is satisfied if a fault occurs by performing a normal control operation by an error recovery algorithm set in the ECU 300.

The report generator 140 may generate a fault injection test result report based on the monitoring result (S480).

The communicator 150 provides an interface with the debugger 200.

Figure 6:
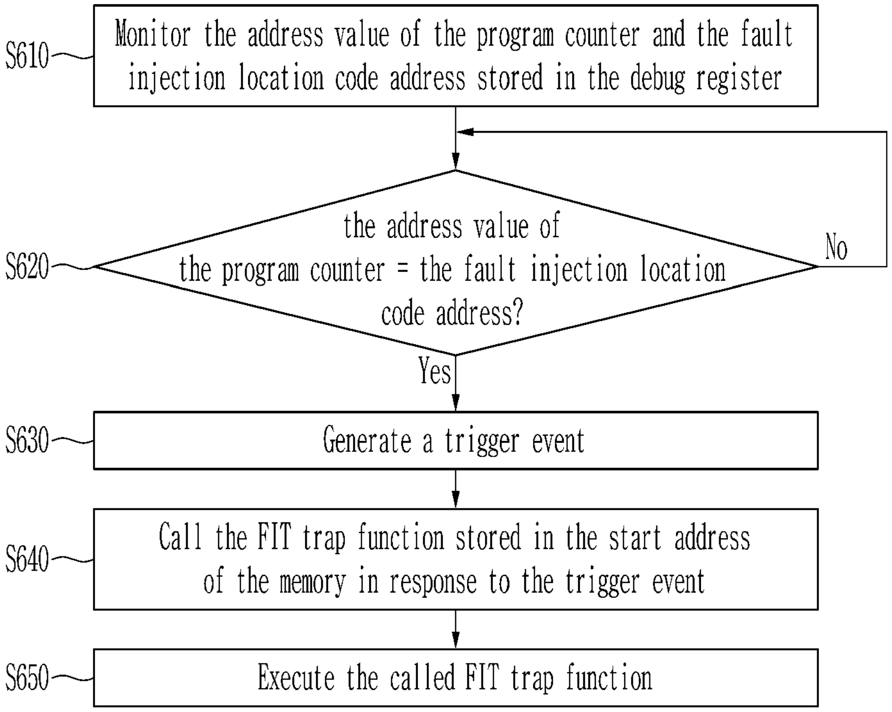
FIG. 6 is a flowchart illustrating a fault injection method of an ECU.

FIG. 6 is a flowchart illustrating a fault injection method of an ECU.

In FIG. 6, the monitor 316 of the CPU 310 in the ECU 300 may monitor the address value of the program counter, which is a part of the general register, and the fault injection location code address stored in the debug register 314 (S610), and check whether the address value of the program counter matches the fault injection location code address stored in the debug register 314.

If the address value of the program counter matches the fault injection location code address (S620), the monitor 316 may generate a trigger event (S630), and output the generated trigger event to the OCDS module 312.

In response to the trigger event, the OCDS module 312 may call the FIT trap function stored in the start address of the memory 320 (S640) and execute the called FIT trap function (S650). While the FIT trap function is executed, a fault in a fault mode designated by a user may be injected into a fault injection location in the ECU 300.

By doing so, the ECU 300 can inject faults without stopping the flow of execution. In addition, regardless of fault injection timing, faults can be injected at the exact.

Figure 7:
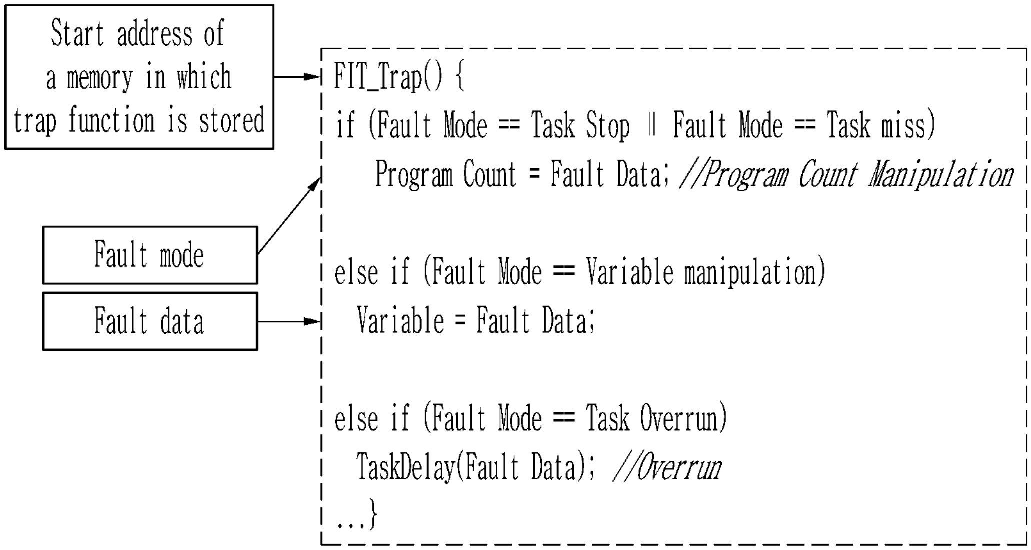
FIG. 7 is a diagram illustrating an example of a FIT trap function stored in a memory of an ECU.

FIG. 7 is a diagram illustrating an example of a FIT trap function stored in a memory of an ECU.

For example, the FIT trap function stored at the start address of the memory 320 may be as shown in FIG. 7.

If executed, the FIT trap function can inject faults corresponding to fault modes designated by the user. Fault modes executed by the FIT trap function may include task stop, task miss, variable manipulation, and task overrun.

Task stop or task miss can be implemented by the FIT trap function manipulating the program counter. Variable manipulation can be implemented by the FIT trap function manipulating the value of a specific variable. Task overruns can be implemented by having the FIT trap function delay a specific task.

As the CPU 310 of the ECU 300 executes the FIT trap function, a fault corresponding to a fault mode (task miss, variable pollution, task delay, etc.) may be injected into the fault injection location of the ECU 300.

Figure 8:
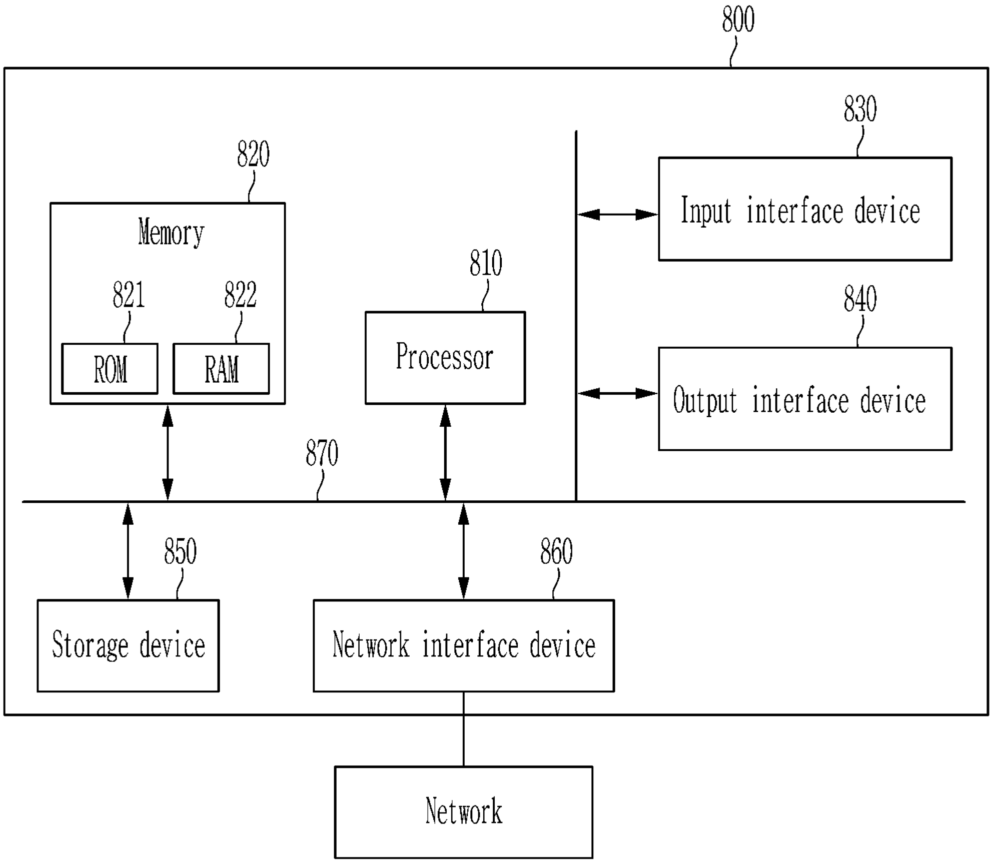
FIG. 8 is a diagram illustrating a FIT apparatus.

FIG. 8 is a diagram illustrating a FIT apparatus.

Referring to FIG. 8, the FIT apparatus 800 may represent a computing device in which the fault injection test method of the FIT apparatus 100 described above is implemented.

The FIT apparatus 800 may include at least one of a processor 810, a memory 820, an input interface device 830, an output interface device 840, a storage device 850, and a network interface device 860. Each of the components may be connected by a common bus 870 to communicate with each other. In addition, each of the components may be connected through an individual interface or a separate bus centering on the processor 810 instead of the common bus 870.

The processor 810 may be implemented as various types such as an application processor (AP), a central processing unit (CPU), a graphics processing unit (GPU), etc., and may be any semiconductor device that executes a command stored in the memory 820 or the storage device 850. The processor 810 may execute a program commands stored in at least one of the memory 820 and the storage device 850. The processor 810 stores program commands for implementing at least some functions of the OS information extractor 110, the FIT condition setter 120, the monitor 130, and the report generator 140 described with reference to FIG. 3 in the memory 820, and may control to perform the operation described with reference to FIGS. 1 to 6.

The memory 820 and the storage device 850 may include various types of volatile or non-volatile storage media. For example, the memory 820 may include a read-only memory (ROM) 821 and a random access memory (RAM) 822. The memory 820 may be located inside or outside the processor 810, and the memory 820 may be connected to the processor 810 through various known means.

The input interface device 830 is configured to provide input data to the processor 810.

The output interface device 840 is configured to output data from the processor 810.

The network interface device 860 may transmit or receive a signal with an external device through a wired network or a wireless network.

At least some of the fault injection test method according to the present disclosure may be implemented as a program or software executed on a computing device, and the program or software may be stored in a computer-readable medium.

In addition, at least some of the fault injection test method according to the present disclosure may be implemented as hardware that can be electrically connected to a computing device.

At least some of the fault injection method according to the present disclosure may be implemented as a program or software executed on a computing device, and the program or software may be stored in a computer-readable medium.

In addition, at least some of the fault injection method according to the present disclosure may be implemented as hardware that can be electrically connected to a computing device.

Although the embodiments of the present disclosure have been described in detail above, the scope of the present disclosure is not limited thereto, and various modifications and improvements of those skilled in the art using the basic concepts of the present disclosure defined in the following claims are also included in the present disclosure.

What is claimed is:

1. A method performed by a fault inject test apparatus, the method comprising:

receiving, by the fault injection test apparatus, fault injection conditions from a user, wherein the fault injection conditions comprise a fault injection location code address indicating a fault injection target; and setting, by the fault injection test apparatus connected to a vehicle through a debugger, the fault injection conditions using an on-chip debugging system (OCDS) module built into a central processing unit (CPU) of a vehicle controller of the vehicle, wherein the setting the fault injection conditions comprises:

storing the fault injection location code address in a first debug register in the CPU; and storing, in a second debug register in the CPU, a start address of a memory in the vehicle controller, wherein a trap function, defined for one of a plurality of fault modes, is stored at the start address, and wherein the trap function corresponds to the fault injection location code address, and wherein a trigger signal is generated based on a program counter within the CPU matching the fault injection location code address of the first debug register, and wherein the OCDS module within the CPU calls the trap function in response to the trigger signal.

2. The method of claim 1, wherein the plurality of fault modes comprise two or more of: a task stop, a task miss, a variable manipulation, or a task overrun.

3. The method of claim 1, wherein the fault injection conditions further comprise a fault mode, of the plurality of fault modes, to be injected into the fault injection target, and wherein the method further comprises:

injecting, by the CPU of the vehicle controller executing the trap function, a fault of the fault mode into the fault injection target in the vehicle controller; and monitoring an injection result of the fault.

4. The method of claim 1, wherein the storing the fault injection location code address comprises setting, by a hardware breakpoint in the OCDS module, the fault injection location code address in the first debug register.

5. A fault injection test apparatus comprising:

one or more processors; and memory storing instructions that, when executed by the one or more processors, cause the fault injection test apparatus to:

extract, based on an operating system (OS) software information file of a vehicle controller, fault injection location code addresses of fault injection targets from the vehicle controller;

store, using an on-chip debugging system (OCDS) module built into a central processing unit (CPU) of the vehicle controller, the fault injection location code addresses, of the fault injection targets designated by a user, in a first debug register inside the CPU of the vehicle controller; and store, in a second debug register inside the CPU of the vehicle controller, a start address of a memory of the vehicle controller where a trap function, defined for one of a plurality of fault modes, is stored, wherein the trap function is for injecting a fault, corresponding to a fault mode designated by the user, into one of the fault injection targets, and wherein a trigger signal is generated based on a program counter within the CPU matching the fault injection location code address of the first debug register, and wherein the OCDS module within the CPU calls the trap function in response to the trigger signal.

6. The fault injection test apparatus of claim 5, wherein the instructions, when executed by the one or more processors, further cause the fault injection test apparatus to:

monitor an injection result of the fault; and inject, by the CPU of the vehicle controller executing the trap function, the fault of the fault mode designated by the user into the one of the fault injection targets in the vehicle controller.

7. The fault injection test apparatus of claim 5, wherein the fault injection location code addresses are set in the first debug register by a hardware breakpoint in the OCDS module.

8. The fault injection test apparatus of claim 5, wherein the plurality of fault modes comprise two or more of: a task stop, a task miss, a variable manipulation, or a task overrun.

9. A method comprising:

setting, by a fault injection test apparatus and in a first debug register inside a central processing unit (CPU) of a vehicle controller, a fault injection location code address of a fault injection target designated by a user;

calling, from a memory of the vehicle controller and based on an address value of a program counter inside the CPU matching the fault injection location code address, a trap function to be executed, wherein the trap function corresponds to the fault injection location code address; and executing the trap function to inject a fault, of a fault mode designated by the user, into the fault injection target, wherein the calling the trap function comprises:

generating a trigger event based on the address value of the program counter matching the fault injection location code address; and calling, by an on-chip debugging system (OCDS) module built into the CPU, the trap function based on the trigger event.

10. The method of claim 9, further comprising:

prior to the calling the trap function, storing, via the fault injection test apparatus, the trap function in the memory of the vehicle controller.

11. The method of claim 9, further comprising:

prior to the calling the trap function, setting, via the fault injection test apparatus, a start address of the memory where the trap function of the fault mode is stored in a second debug register inside the CPU, wherein the calling the trap function comprises outputting the start address of the memory based on the trigger event.

12. The method of claim 9, wherein the trap function is defined for one of a plurality of fault modes.

13. The method of claim 12, wherein the plurality of fault modes comprise two or more of: a task stop, a task miss, a variable manipulation, or a task overrun.

14. The method of claim 9, wherein the trap function is stored at a start address of the memory.

* * * * *